(12) United States Patent
Schödlbauer

(10) Patent No.: US 6,466,889 B1
(45) Date of Patent: Oct. 15, 2002

(54) METHOD AND APPARATUS FOR DETERMINING ABSOLUTE POSITION OF DISPLACEMENT AND ANGLE SENSORS

(75) Inventor: Dieter Schödlbauer, München (DE)

(73) Assignee: Ruf Electronics, GmbH, Hohenkirchen (DE)

( * ) Notice: Subject to any disclaimer, the term of this patent is extended or adjusted under 35 U.S.C. 154(b) by 0 days.

(21) Appl. No.: 09/428,180

(22) Filed: Oct. 27, 1999

(30) Foreign Application Priority Data

Oct. 27, 1998 (DE) .......................... 198 49 554

(51) Int. Cl.⁷ .......................... G01C 9/00; G01C 17/00; G01C 19/00
(52) U.S. Cl. .......................... 702/150
(58) Field of Search .......................... 702/150, 151, 702/152, 33, 36, 94, 95, 183; 33/1 PT; 324/207.2, 173, 174, 207.17, 207.25, 207.21

(56) References Cited

U.S. PATENT DOCUMENTS

| | | | | |
|---|---|---|---|---|
| 4,774,464 A | * | 9/1988 | Kubota et al. | 324/207.25 |
| 5,003,260 A | * | 3/1991 | Auchterlonie | 324/16 |
| 5,239,490 A | * | 8/1993 | Masaki et al. | 702/41 |
| 5,301,434 A | * | 4/1994 | Imaizumi | 33/1 N |
| 5,428,290 A | * | 6/1995 | Porcher | 324/207.16 |
| 5,687,103 A | * | 11/1997 | Hagl et al. | 702/150 |
| 5,710,509 A | * | 1/1998 | Goto et al. | 324/207.25 |
| 5,783,925 A | * | 7/1998 | Umemura et al. | 318/661 |
| 5,841,274 A | * | 11/1998 | Masreliez et al. | 324/207.17 |
| 5,900,727 A | * | 5/1999 | Griffen et al. | 324/173 |
| 5,930,905 A |   | 8/1999 | Zabler et al. | |
| 6,034,624 A | * | 3/2000 | Goto et al. | 340/870.32 |
| 6,212,783 B1 | * | 4/2001 | Ott et al. | 33/1 PT |
| 6,246,232 B1 | * | 6/2001 | Okumura | 324/207.2 |
| 6,294,910 B1 | * | 9/2001 | Travostino et al. | 324/207.25 |

FOREIGN PATENT DOCUMENTS

| | | |
|---|---|---|
| DE | 4217498 C2 | 10/1995 |
| DE | 19506938 A1 | 8/1996 |
| DE | 19539134 A1 | 4/1997 |
| DE | 19632656 A1 | 2/1998 |
| DE | 19747753 C1 | 5/1999 |
| FR | 92 13406 | 11/1992 |

* cited by examiner

Primary Examiner—John S. Hilten
Assistant Examiner—Demetrius R. Pretlow
(74) Attorney, Agent, or Firm—Senniger, Powers, Leavitt & Roedel

(57) ABSTRACT

A method and apparatus for determining the absolute position of displacement and angle transmitters. Two individual sensors are mechanically coupled to one another in such a way that they generate sawtooth output signals with a number of periods that differ by one within a predetermined measuring range. In a first step, a difference signal is formed from the output signals of both sensors and, if negative, is corrected by a constant value. A period number signal is obtained from the corrected difference signal by deriving an integer. This period number signal and the output signal of one sensor are added to form a highly accurate, absolute output signal. Since the absolute output signal still contains errors, an auxiliary signal is formed from the absolute output signal and the modified, corrected difference signal. A window discriminator determines whether the auxiliary signal lies within a predetermined limiting range. If not, the absolute output signal is corrected by a predetermined amount.

20 Claims, 6 Drawing Sheets

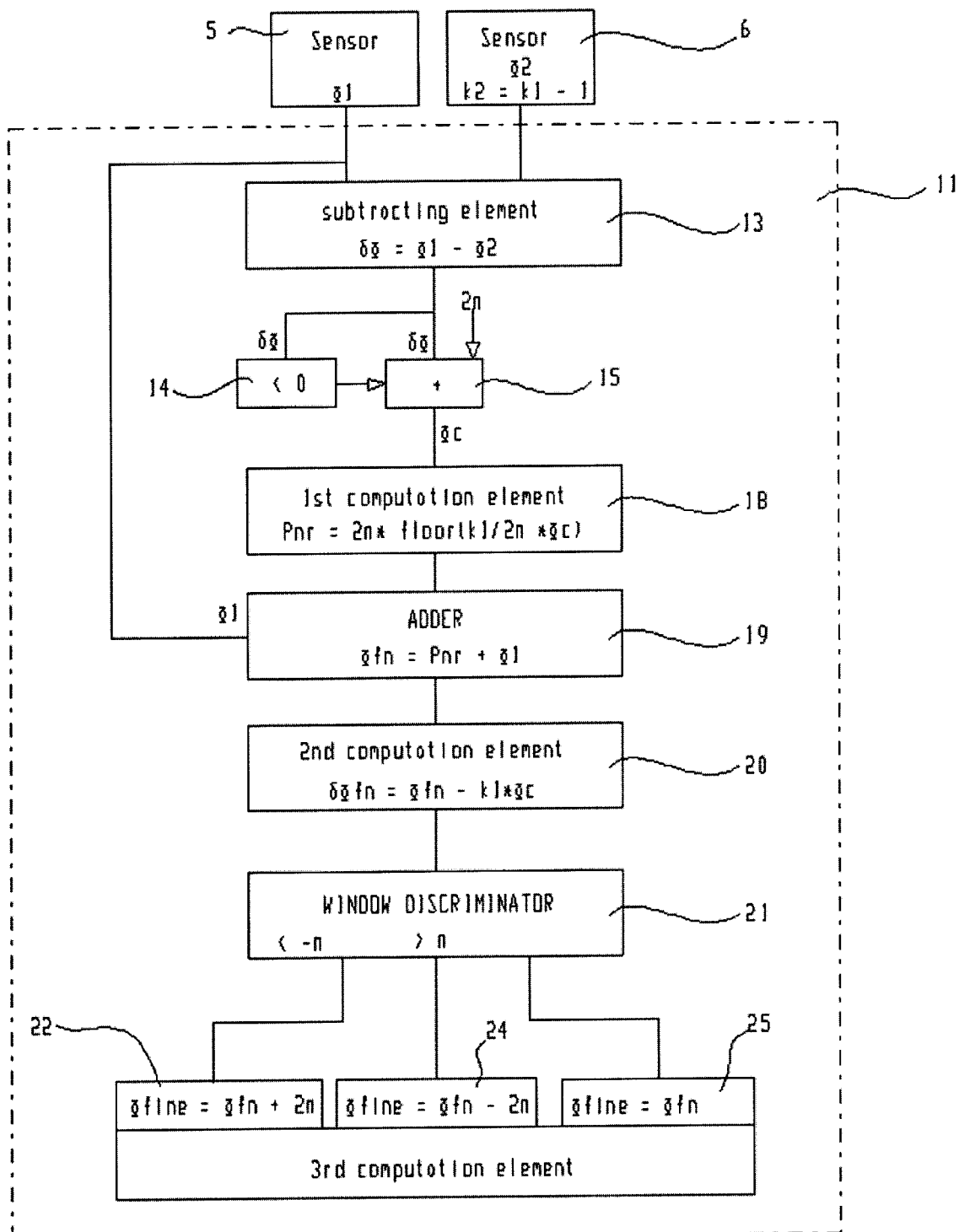
FIG. B

METHOD AND APPARATUS FOR DETERMINING ABSOLUTE POSITION OF DISPLACEMENT AND ANGLE SENSORS

CROSS REFERENCE TO FOREIGN APPLICATION

This application claims priority based on German Utility Model No. 198 49 554.4, filed Oct. 27, 1998, the entire disclosure of which is incorporated herein by reference.

BACKGROUND OF THE INVENTION

The invention generally relates to position sensors such as displacement sensors and angle sensors and, particularly, to a method and apparatus for determining the absolute position of such sensors.

DE 195 06 938 discloses a method and device for measuring the angle of a rotatable body. Two individual sensors that are mechanically coupled are used. The mechanical coupling is realized by means of gears, where the number of gear teeth differ by one. Both sensors deliver a periodic signal. Optical, magnetic, capacitive, inductive or resistive sensors, i.e., contacting or non-contacting sensors, may be considered for this method.

In this known method, the difference between the measured values of each sensor multiplied by the respective number of teeth is calculated, and this value is standardized to the periodicity of the sensors. The measured angle is then determined by taking another difference, and it is determined whether the angle is negative. If it is, one complete angle period is added.

DE 196 32 656 A1 describes a method and a device for the non-contacting measurement of the position or rotational position of an object that contains two parallel tracks with magnetized increments, with the number of increments per track preferably differing by one. One sensor that respectively generates a sinusoidal or cosinusoidal output signal, depending on the relative position between the sensor and the respective increment of the track, is assigned to each track. This publication also discusses the fact that the phase difference between the angles of the sinusoidal signals of each track results in a linear signal that is piecewise positive or negative. If this signal is negative, a constant value (of $2\pi$) is added to the difference signal.

DE 42 17 498 C2 describes an angle sensor with two tracks that have different divisions. For example, 1024 periods of markings per full circle are provided on one track and 1037 periods of markings per full circle are provided on the other track. Each track delivers both a sinusoidal and a cosinusoidal signal. Angle values for both tracks are calculated from the are tangent of the sinusoidal and the cosinusoidal signals of both tracks, with the difference of both angle values then being determined. The integral portion is then formed from this difference, with the integral portion resulting in an approximate angle value after it is multiplied by a factor. An accurate angle value is obtained by multiplying the angle value of one track by a factor. A high-resolution, absolute angle value is then obtained by adding the approximate angle value and the accurate angle value.

SUMMARY OF THE INVENTION

The invention meets the above needs and overcomes the deficiencies of the prior art by providing an improved method and apparatus of determining the absolute position of displacement and angle sensors. Among the several objects and features of the present invention may be noted the provision of such method and apparatus that permits a very precise, linear output signal even if the sensors do not deliver exactly linear output signals; the provision of such method and apparatus that prevents adding linearity errors of the sensors; the provision of such method and apparatus and the provision of such method and apparatus that is economically feasible and commercially practical.

Briefly described, a method embodying aspects of the invention determines the absolute position of two mechanically coupled sensors. The first sensor generates an output signal with a first number of periods and the second sensor generates an output signal with a second number of periods within the measuring range. The two numbers of periods differ by one. In a first step, a difference signal is formed from the output signals of the two sensors. If the difference signal is negative, the method adds a constant value to the difference signal to form a corrected difference signal. The method also includes multiplying the corrected difference signal by the first period number and then dividing it by the measuring range. After rounding this value to the next lower integer, the method multiplies the integer by the to measuring range to form a period number signal. The method further includes the steps of adding the output signal of one sensor to this period number signal to form a highly accurate, absolute output signal and forming an auxiliary signal in the form of the difference between the absolute output signal and the corrected difference signal multiplied by the period number of this sensor. The method then determines whether this auxiliary signal lies within a predetermined limiting range and further corrects the corrected, absolute output signal by adding or subtracting a predetermined value if the auxiliary signal lies outside the limiting range.

In another embodiment, an apparatus determines the absolute position of two mechanically coupled sensors. The sensors generate essentially linear, sawtooth output signals having a different number of periods within the measuring range. The number of periods of each sensor differs by one from each other. The apparatus includes an evaluation circuit having a subtracting element, a comparator and an adding element. The subtracting element forms a difference signal from the two output signals of the sensors. The comparator then determines whether the difference signal is negative. Depending on the comparison, the adding element adds a constant value to the difference signal to form a corrected difference signal. A computation component derives an integer value from the corrected difference signal multiplied by the period number of one sensor and divided by the measuring range. The computation component then multiplies this integer value by the measuring range to obtain a period number signal. The apparatus also includes another adding element for adding the period number signal and the output signal of one sensor to form a highly accurate, absolute output signal. Another computation component forms an auxiliary signal in the form of the difference between the absolute output signal minus the product of the period number of one sensor and the corrected difference signal. The apparatus further includes a window discriminator that determines whether the auxiliary signal lies within a predetermined limiting range and a third computation component that alters the absolute output signal by a correction value depending on the result of the window discriminator. This forms an absolute output signal that is free of errors.

Alternatively, the invention may comprise various other methods and systems.

Other objects and features will be in part apparent and in part pointed out hereinafter.

BRIEF DESCRIPTION OF THE DRAWINGS

The invention is described below in greater detail with reference to an embodiment that is illustrated in the figures. The figures show:

FIG. 8, a block diagram of the system according to the invention.

Corresponding reference characters indicate corresponding parts throughout the drawings.

DETAILED DESCRIPTION OF PREFERRED EMBODIMENTS

Figure 1:
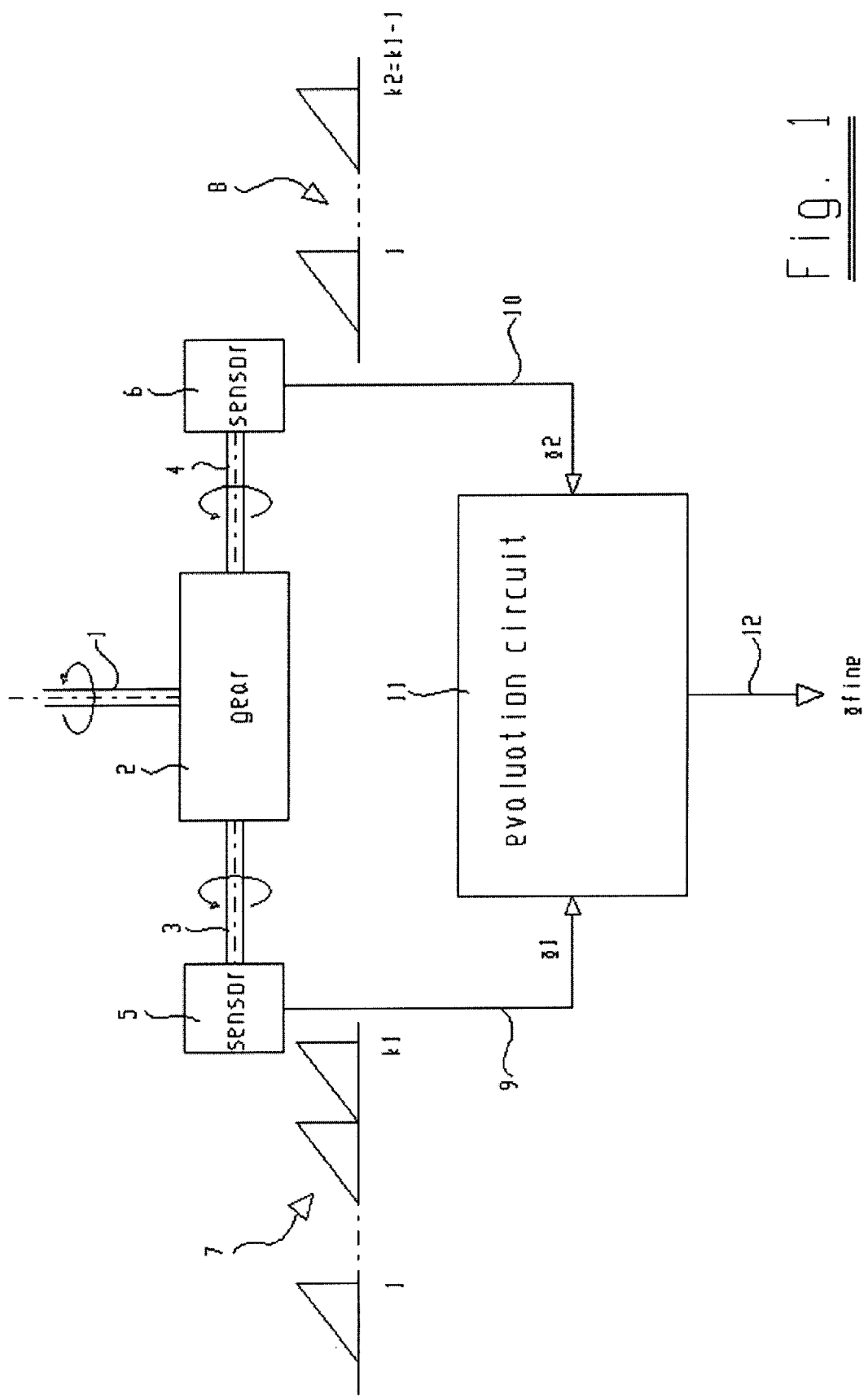
FIG. 1, a basic circuit diagram of a circuit arrangement according to the invention.

The description initially refers to FIG. 1. Reference character 1 indicates a shaft, the rotary position of which is to be measured. A gear 2 with drive shafts 3 and 4 drives two sensors 5 and 6. The sensors 5, 6 generate a linear output signal within a measuring range which is periodically repeated over the measuring range. The type of sensors 5, 6 used may be selected as desired. For example, DE 195 39 134 A1 and DE 197 47 753 C1, the entire to disclosures of which are incorporated herein by reference, describe sensors that may be used. Naturally, the sensors may also consist of displacement sensors or linear sensors that are mechanically coupled. Conventional potentiometers may also be used as sensors.

The sensors 5, 6 deliver periodically repeated output signals $\Phi_1$ and $\Phi_2$, respectively, as a function of the location (angle or displacement) at their outputs 9 and 10, respectively.

The two individual sensors 5, 6 are driven with a different speed ratio by utilizing a suitable arrangement, e.g., the gear 2. The respective output signals form sawtooth functions of the angle or the location. The gear 2 is designed in such a way that the desired displacement or angle measuring range contains $k_1$ periods of one sensor 5 and $k_2=k_1-1$ periods of the other sensor 6. These sawtooth signals are designated by the reference symbols 7 and 8 in FIG. 1 and are supplied to an evaluation circuit 11, which is described in greater detail below with reference to FIG. 7. A highly accurate, error-corrected output signal $\Phi_{fine}$ that is linear over the entire measuring range of $k_1$ periods of the sensor 5 then appears at the output of the evaluation circuit 11.

Figure 2:
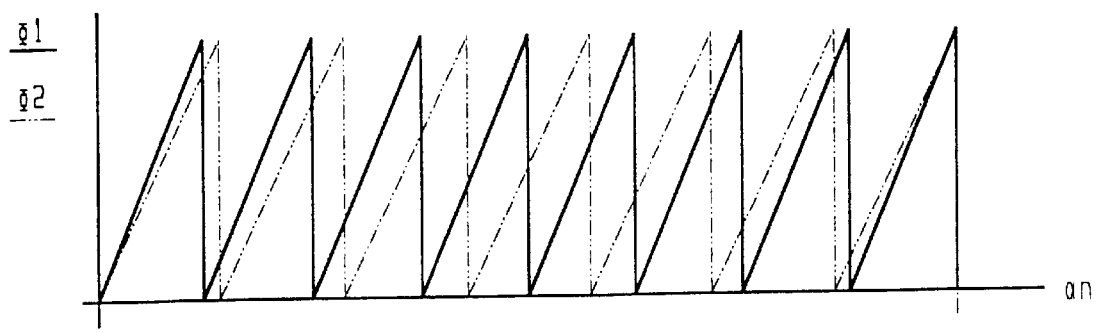
FIG. 2, a diagram of the sensor output signals over the measuring range.

FIG. 2 shows the two sawtooth output signals of the sensors 5, 6, where the sensor 5 has eight periods over the measuring range designated by $2\pi$, and the sensor 6 has only seven periods.

Figure 3:
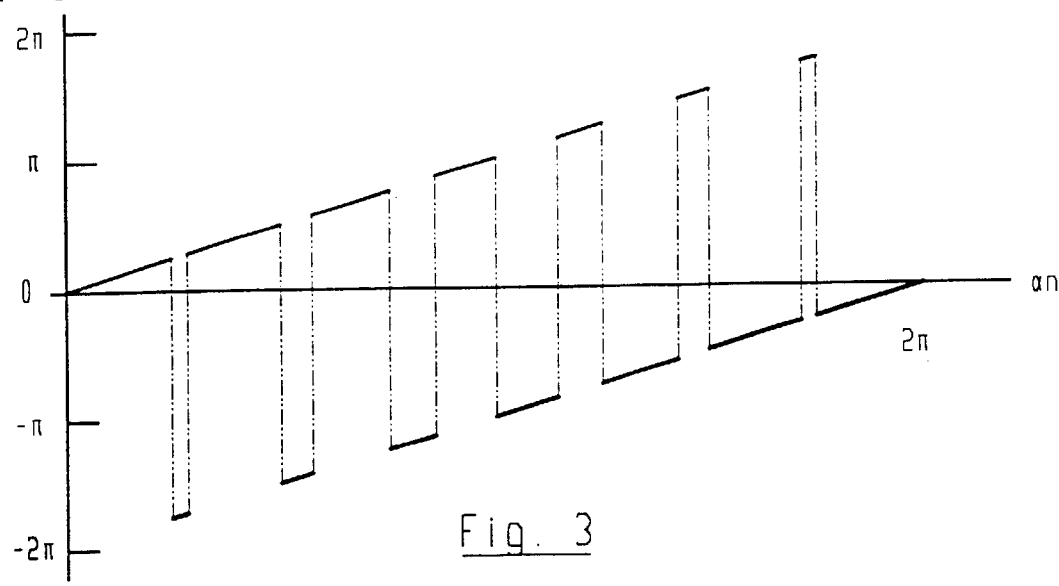
FIG. 3, a diagram of a difference signal formed from both sensor signals over the measuring range.
Figure 7:
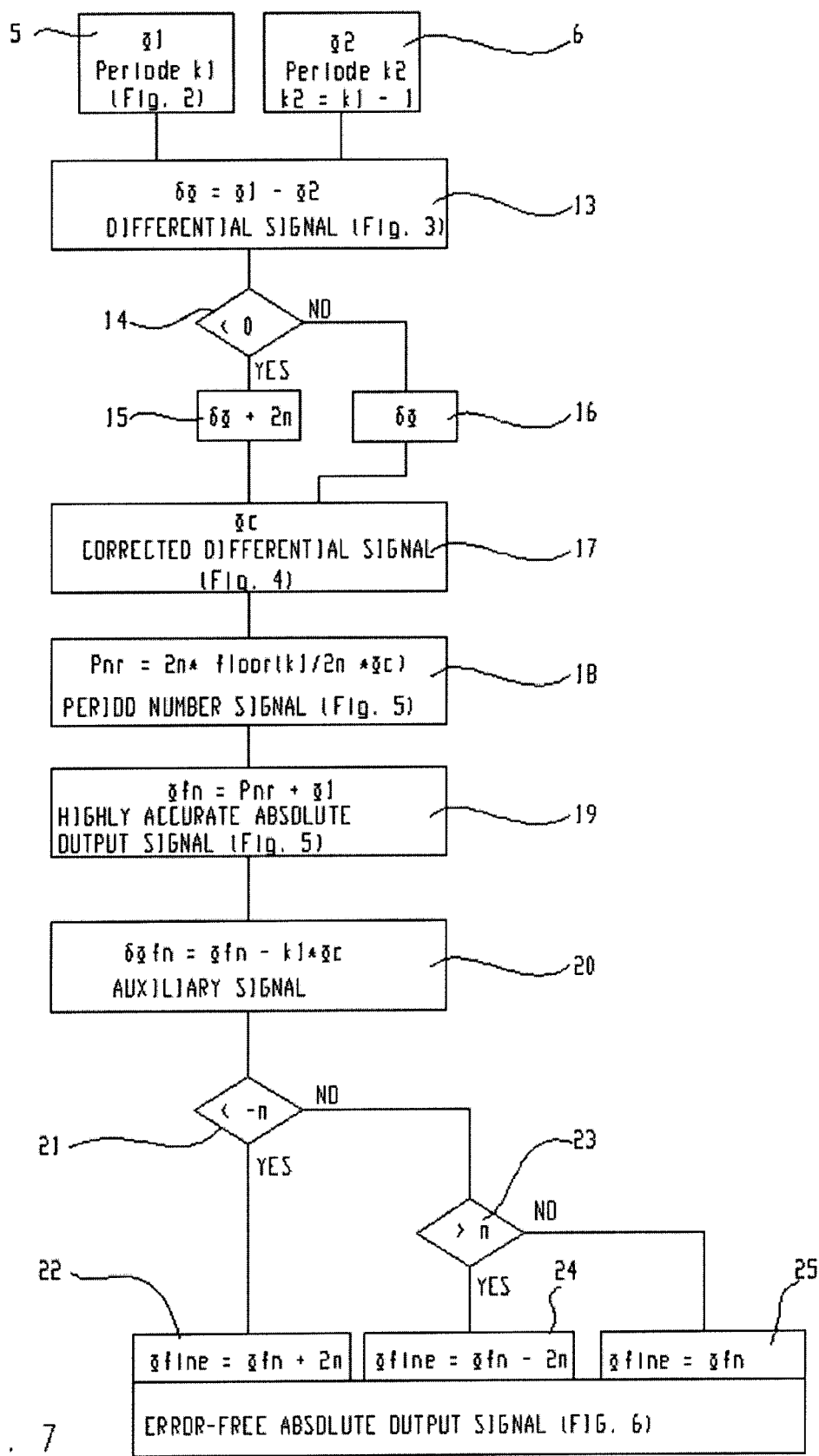

A difference signal $\delta\Phi=\Phi_1-\Phi_2$ that is shown in FIG. 3 is formed in a first step (see the subtracting element 13 in FIG. 7).

For reasons of simplicity, it is assumed that the output signals of the sensors 5, 6 are present in the form of digitized numerical values, i.e., these signals are available in a form in which they can be easily processed further. In order that the description remains as universal as possible, the respective total displacement or total angle to be determined and the range of values of the sensors 5, 6 are normalized to the numerical value $2\pi$.

Figure 4:
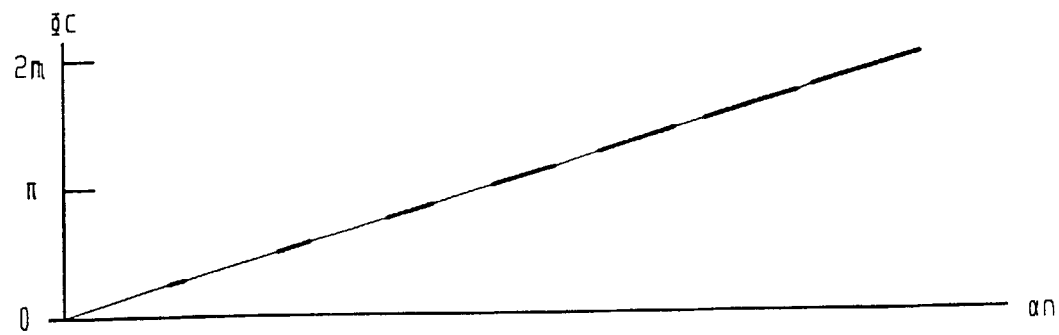
FIG. 4, a corrected difference signals formed from the sensor output signals over the measuring range.

The difference signal $\delta\Phi$ contains jumps on the order of $-2\pi$ which are caused by the unsteadiness of both signals $\Phi_1$ and $\Phi_2$. The desired range of values lies between 0 and $+2\pi$, i.e., the jumps result in negative numbers. Consequently, a first correction or adjustment can be carried out by shifting the negative values of the signal $\delta\Phi$ upward by the amount $+2\pi$. The following mathematical condition applies: if $\delta\Phi$ is negative, $2\pi$ is added. If $\delta\Phi$ is greater than or equal to 0, it remains unchanged. The result of this first correction is shown in FIG. 4 as the signal $\Phi_c$. The comparator 14 according to FIG. 7 determines whether $\delta\Phi<0$. If this is the case, the value $2\pi$ is added in the adding element 15. If this is not the case, $\delta\Phi$ is forwarded in unchanged fashion (see block 16). The corrected difference signal according to FIG. 4 is then obtained in block 17.

This corrected difference signal $\Phi_c$ represents an approximately accurate, absolute output signal over the entire displacement or angular range to be evaluated (useful range or measuring range).

Due to different errors of the sensors 5, 6, the two output signals $\Phi_1$ and $\Phi_2$ are not as precise or as linear as desired. Consequently, the corrected difference signal $\Phi_c$ is also not as precise or as linear as desired, but may contain a certain waviness that is not taken into consideration in FIGS. 2–4. In order to eliminate these errors, one proceeds as described below. In a computation component 18, the weight of the current period of one sensor (i.e., sensor 5) is determined from the corrected difference signal $\Phi_c$, i.e., the valid period number is multiplied by $2\pi$. This is realized by rounding or truncating the corresponding integral number within the range between 0 and $k_1-1$ and a multiplication by $2\pi$. Consequently, one attains a period number signal Pnr with the relation:

$$Pnr = 2\pi \text{ floor } (k\frac{1}{2}\pi \cdot \Phi_c),$$

where the function floor designates the operation of truncating to the corresponding integral number or rounding off to the next lower integer. The corresponding signal Pnr is drawn with broken lines in FIG. 5.

Figure 5:
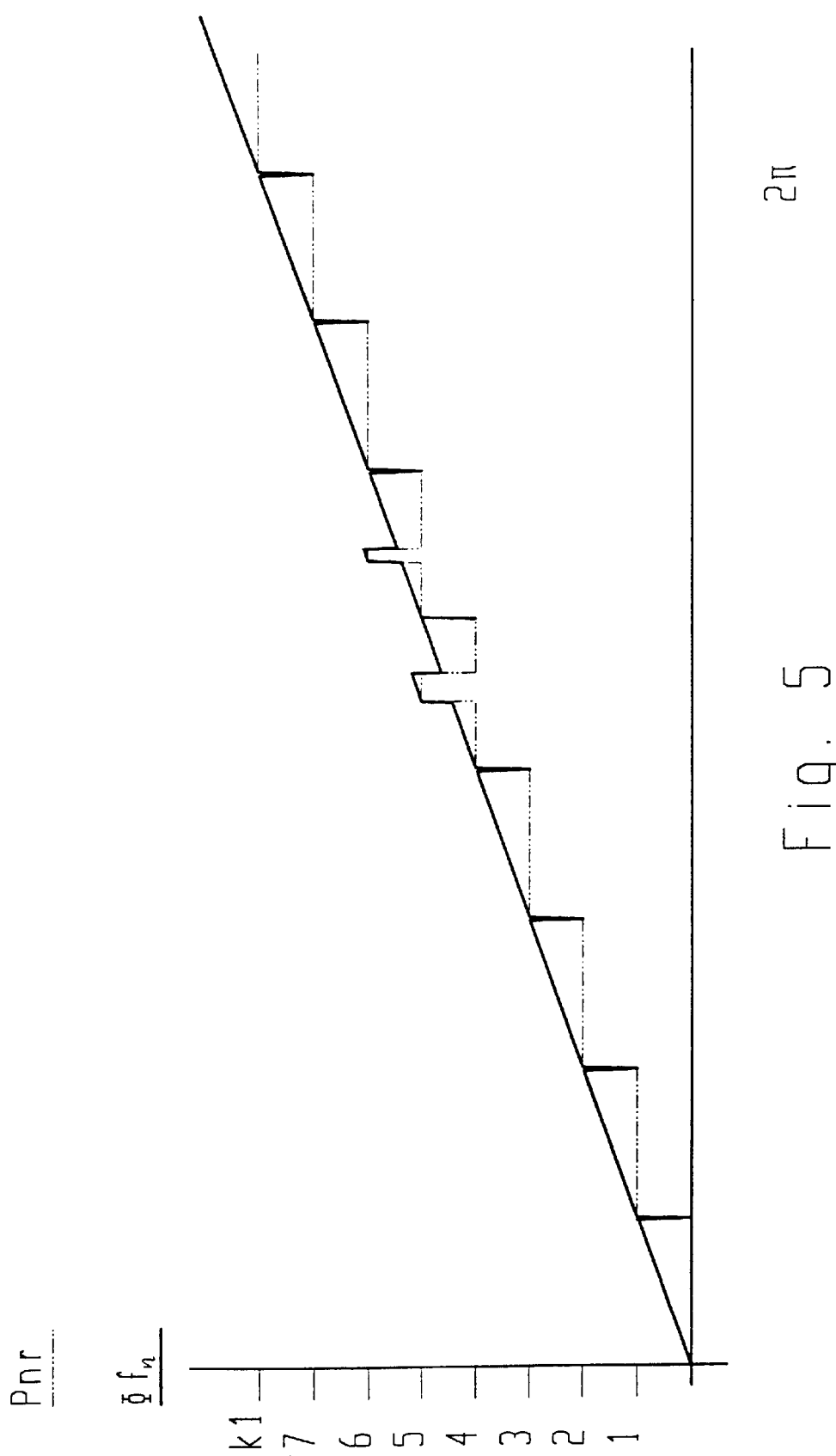
FIG. 5, a diagram of a signal that illustrates the phase number and of a highly accurate output signal with period jumps.

An output signal that is more accurate than the difference signal $\delta\Phi$ defined above results from the current period number Pnr and the output signal $\Phi_1$ of one of the sensors; here, the sensor 5. Consequently, a highly precise, absolute output signal $\Phi f_n = Pnr + \Phi_1$, which is drawn with a continuous line in FIG. 5, is attained in the adding element 19. However, this signal $\Phi f_n$ still contains errors. Period jumps occur due to the non-linear individual signals after rounding off or truncating to an integer. This can be easily ascertained from FIG. 5.

In the subtracting element 20, an auxiliary value $\delta\Phi f_n$ which represents the difference of the highly accurate output signal $\Phi f_n$ that still contains errors minus the approximately accurate difference signal $\Phi_c$ multiplied by $k_1$ is formed, i.e.:

$$\delta\Phi f_n = \Phi f_n - k_1 \cdot \Phi_c.$$

Figure 6:
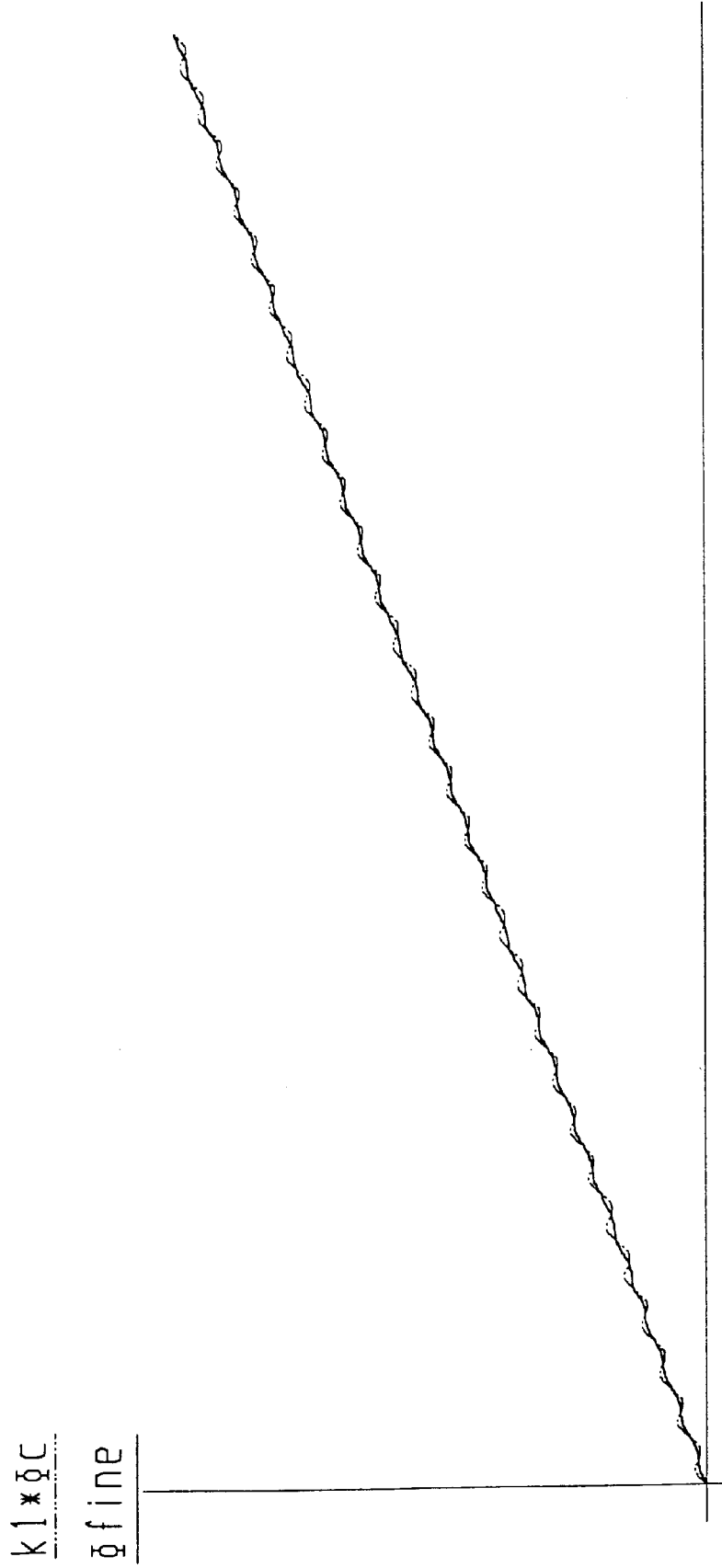
FIG. 6, an approximate difference signal and a corrected, highly accurate output signal, and FIG. 7, a flow chart of the method according to the invention.

Period jumps can be detected and corrected on the basis of this auxiliary signal obtained from the subtracting element 20. This auxiliary signal may lie within a range between $-\pi$ and $+\pi$. Consequently, the comparator 21 determines whether the auxiliary signal is $<-\pi$. If this is the case, the highly precise, absolute output signal $\Phi f_n$ (from the adding element 19) is corrected by $+2\pi$ (adding element 22). However, if this is not the case, comparator 23 determines whether the auxiliary signal is $>\pi$. If so, the highly precise, absolute output signal $\Phi f_n$ is corrected by $-2\pi$ in a subtracting element 24. If not, no period jump exists and the highly precise, absolute output signal $\Phi f_n$ remains unchanged, as shown by the element 25. The output signal from the elements 22, 24 or 25 then represents an absolute output signal $\Phi_{fine}$ over the entire measuring range which is now free of error. This signal is drawn with a continuous line in FIG. 6. For reasons of comparison, the corrected difference signal $\Phi_c$ from the block 17 is also indicated in broken lines, where said difference signal is multiplied by the value $k_1$. FIG. 6 merely serves for illustration purposes and is not intended as a precise statement regarding the actual size relations of the signals. However, FIG. 6 shows that the variations or the measuring error in the method according to the invention is reduced in comparison to an embodiment in which only the corrected difference signal is output.

In practical applications, the invention can be implemented by a programmable microprocessor, the microprocessor constituting an evaluation circuit.

In operation, the basic principle of the invention consists of determining the period number of one of the sensors, adding the current output signal of one of the sensors to this integral period number and determining as well as correcting possible errors of the signal for the current period number with an auxiliary value.

The two individual sensors are mechanically coupled in such a way that one sensor generates an output signal with a first number $k_1$ of periods within the full measuring range and the second sensor generates an output signal with a second number $k_2$ of periods within the same measuring range, where $k_2$ is less than $k_1$ by one. In this case, it is assumed that the output signals of both sensors are essentially linear. In a first step, the difference between the output signals of the sensors is formed. If this difference is negative, a corrected difference signal is formed by adding a constant value to the difference signal. A period number signal that corresponds to the current period is produced by rounding off or truncating this corrected difference signal to an integer and a subsequent multiplication by a scaling factor. The current output signal of one of the sensors is added to this period number signal such that a highly accurate signal, which still contains errors, however, is formed. An auxiliary value is generated by subtracting the product from the multiplication of the period number $k_1$ by the corrected difference signal from the highly accurate signal that still contains errors. If this auxiliary value lies within a predetermined range, the corrected difference signal is used as the final output signal. However, if the auxiliary value lies outside this range, the highly accurate signal that still contains errors is corrected by adding or subtracting a correction value.

In principle, this means that linearity errors of both sensors are not added.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method for determining an absolute position of first and second sensors, said sensors being mechanically coupled to each other, said first sensor generating an output signal having a first number of periods within a measuring range, said second sensor generating an output signal having a second number of periods within the measuring range, said first and second numbers of periods differing by one, said method comprising the steps of;

comparing the output signals of the first and second sensors;

generating a difference signal representative of the comparison of tile output signals;

adjusting the difference signal when the difference signal is negative by adding a first predetermined value thereto;

determining an integer approximation of the adjusted difference signal multiplied by the first number of periods and divided by the measuring range;

generating a period number signal by multiplying the integer approximation by the measuring range;

generating an absolute output signal representative of the absolute position of the first and second sensors by adding the output signal of the first sensor to the period number signal;

generating an auxiliary signal as a function of the absolute output signal, said auxiliary signal being based on a difference between the absolute output signal and the adjusted difference signal multiplied by the first number of periods;

determining whether the auxiliary signal is within a predetermined range; and adjusting the absolute output signal when the auxiliary signal is outside the predetermined range by adding a second predetermined value thereto.

2. The method of claim 1 wherein the output signals are sawtooth signals.

3. The method of claim 1 wherein the measuring range is $2\pi$.

4. The method of claim 1 further comprising the step of driving the first and second sensors at different speed ratios.

5. The method of claim 1 wherein the first number of periods is one more than the second number of periods.

6. The method of claim 1 wherein the adjusted absolute output signal is substantially linear over the measuring range.

7. The method of claim 1 wherein the first predetermined value is $2\pi$.

8. The method of claim 1 wherein the predetermined range is between approximately $-\pi$ and $+\pi$.

9. The method of claim 1 wherein the second predetermined value is $+2\pi$ if the auxiliary signal is less than $-\pi$ and $-2\pi$ if the auxiliary signal is greater than $+\pi$.

10. An apparatus for determining an absolute position of first and second sensors, said sensors being mechanically coupled to each other, said first sensor generating an output signal having a first number of periods within a measuring range, said second sensor generating an output signal having a second number of periods within the measuring range, said first and second numbers of periods differing by one, said apparatus comprising:

a subtracting element for comparing the output signals of the first and second sensors generating a difference signal representative of the comparison of the output signals;

a first adding element for adjusting the difference signal when the difference signal is negative by adding a first predetermined value thereto;

a first computation component for determining an integer approximation of the adjusted difference signal multiplied by the first number of periods and divided by the measuring range and for generating a period number signal by multiplying the integer approximation by the measuring range;

a second adding element for generating an absolute output signal representative of the absolute position of the first and second sensors by adding the output signal of the first sensor to the period number signal;

a second computation component for generating an auxiliary signal as a function of the absolute output signal, said auxiliary signal being based on a difference between the absolute output signal and the adjusted difference signal multiplied by the first number of periods;

a window discriminator for determining whether the auxiliary signal is within a predetermined range; and a third computation component for adjusting the absolute output signal when the auxiliary signal is outside the predetermined range by adding a second predetermined value thereto.

11. The apparatus of claim 10 wherein the output signals are sawtooth signals.

12. The apparatus of claim 10 wherein the measuring range is $2\pi$.

13. The apparatus of claim 10 further comprising a gear for driving the first and second sensors at different speed ratios.

14. The apparatus of claim 10 wherein the first number of periods is one more than the second number of periods.

15. The apparatus of claim 10 wherein the adjusted absolute output signal is substantially linear over the measuring range.

16. The apparatus of claim 10 wherein the first predetermined value is $2\pi$.

17. The apparatus of claim 10 wherein the predetermined range is between approximately $-\pi$ and $+\pi$.

18. The apparatus of claim 10 wherein the second predetermined value is $+2\pi$ if the auxiliary signal is less than $-\pi$ and $-2\pi$ if the auxiliary signal is greater than $+\pi$.

19. Method for determining the absolute position of two mechanically coupled sensors, a first sensor generating an output signal with a first number of periods within a measuring range and a second sensor generating an output signal with a second number of periods within the measuring range, said first and second numbers of periods differing by one, said method comprising the steps of:

a) forming a difference signal from the output signals of the two sensors;

b) determining whether the difference signal is negative and adding a constant value to the difference signal if the difference signal is negative to form a corrected difference signal;

c) rounding the corrected difference signal that is multiplied by the first period number and divided by the measuring range to the next lower integer and then multiplying the integer by the measuring range to form a period number signal;

d) adding the output signal of one sensor to the period number signal to form a highly accurate, absolute output signal;

e) forming an auxiliary signal in the form of the difference between the absolute output signal and the corrected difference signal multiplied by the period number of one sensor;

f) determining whether the auxiliary signal lies within a predetermined limiting range; and g) further correcting the corrected absolute output signal by adding or subtracting a predetermined value if the auxiliary signal lies outside the limiting range.

20. Apparatus for implementing the method according to claim 19, wherein two mechanically coupled sensors generate an essentially linear, sawtooth output signal having a number of periods $k_1$, $k_2$, respectively, within a measuring range, said numbers of periods of both sensors differing by one, said apparatus comprising an evaluation circuit having:

a) a subtracting element for forming a difference signal from the two output signals of the sensors;

b) a comparator that determines whether the difference signal is negative;

c) a first adding element that adds a constant value to the difference signal depending on the comparison to form a corrected difference signal;

d) a first computation component that derives an integer value from the corrected difference signal multiplied by the period number of one sensor and divided by the measuring range, said first computation component multiplying the integer value by the measuring range to obtain a period number signal;

e) a second adding element for adding the period number signal and the output signal of one sensor to form a highly accurate, absolute output signal;

f) a second computation component for forming an auxiliary signal in the form of the difference between the absolute output signal minus the product of the period number of one sensor and the corrected difference signal;

g) a window discriminator that determines whether the auxiliary signal lies within a predetermined limiting range; and h) a third computation component that alters the absolute output signal by a correction value depending on the result of the window discriminator to form an absolute output signal that is free of errors.

* * * * *